(12) United States Patent
Bryson et al.

(10) Patent No.: US 11,902,661 B2
(45) Date of Patent: Feb. 13, 2024

(54) DEVICE MOTION AWARE TEMPORAL DENOISING

(71) Applicant: Lenovo (Singapore) Pte. Ltd., New Tech Park (SG)

(72) Inventors: Barrett Bryson, Raleigh, NC (US); John W. Nicholson, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 107 days.

(21) Appl. No.: 17/569,768

(22) Filed: Jan. 6, 2022

(65) Prior Publication Data
US 2023/0217109 A1 Jul. 6, 2023

(51) Int. Cl.
*H04N 23/68* (2023.01)

(52) U.S. Cl.
CPC ....... *H04N 23/683* (2023.01); *H04N 23/6811* (2023.01); *H04N 23/6812* (2023.01)

(58) Field of Classification Search
None
See application file for complete search history.

(56) References Cited

U.S. PATENT DOCUMENTS

| | | | |
|---|---|---|---|
| 2006/0100839 A1* | 5/2006 | Horiuchi | G06F 30/367 703/14 |
| 2017/0195591 A1* | 7/2017 | Avadhanam | H04N 23/6811 |
| 2018/0343448 A1* | 11/2018 | Possos | H04N 19/176 |
| 2019/0020894 A1* | 1/2019 | Peng | H04N 19/523 |
| 2020/0364834 A1* | 11/2020 | Ferrés | H04N 23/683 |
| 2022/0188986 A1* | 6/2022 | Rahmati | G06T 5/10 |
| 2022/0256076 A1* | 8/2022 | Douady | G06T 3/4038 |

* cited by examiner

*Primary Examiner* — Cynthia Segura
(74) *Attorney, Agent, or Firm* — Kunzler Bean & Adamson (57) ABSTRACT

An apparatus for device motion aware temporal denoising includes a processor and a memory that stores code executable by the processor to receive video data comprising a sequence of video frames that includes a current frame and one or more preceding frames captured by a video capture device that functions as a camera of a portable electronic device. In various examples, the code causes the processor to determine one or more camera motion compensation adjustments to apply to the one or more preceding frames of the sequence based on one or more non-imaging device motion sensor measurements for the video capture device and to generate a sequence of camera-motion compensated preceding frames by applying the one or more camera motion compensation adjustments to the preceding frames of the sequence. A method and a computer program may perform the functions of the apparatus.

20 Claims, 9 Drawing Sheets

DEVICE MOTION AWARE TEMPORAL DENOISING

FIELD

The subject matter disclosed herein relates to video temporal denoising and more particularly relates to device motion aware temporal denoising.

BACKGROUND

Some portable electronic devices such as a laptop computer, an action camera, a smartphone, a smartwatch, and similar devices can capture video. However, certain video capture components introduce a certain amount of noise. Device motion (e.g., camera motion) may influence video denoising performance. Various existing video denoising solutions are performed entirely in the image domain.

BRIEF SUMMARY

Apparatuses, methods, systems, and program products are disclosed for device motion aware temporal denoising. An apparatus is disclosed for device motion aware temporal denoising includes a processor and a memory that stores code executable by the processor to receive video data comprising a sequence of video frames that includes a current frame and one or more preceding frames captured by a video capture device that functions as a camera of a portable electronic device. In various examples, the code causes the processor to determine one or more camera motion compensation adjustments to apply to the one or more preceding frames of the sequence based on one or more non-imaging device motion sensor measurements for the video capture device and to generate a sequence of camera-motion compensated preceding frames by applying the one or more camera motion compensation adjustments to the preceding frames of the sequence.

A method for device motion aware temporal denoising is disclosed. The method in various examples includes receiving video data comprising a sequence of video frames that includes a current frame and one or more preceding frames captured by a video capture device that functions as a camera of a portable electronic device. The method, in one or more examples, includes determining one or more camera motion compensation adjustments to apply to the one or more preceding frames of the sequence based on one or more non-imaging device motion sensor measurements for the video capture device and generating a sequence of camera-motion compensated preceding frames by applying the one or more camera motion compensation adjustments to the preceding frames of the sequence.

A computer program product for device motion aware temporal denoising is disclosed. The computer program product, in some examples, includes a computer readable storage medium that stores code executable by a processor, the executable code comprising code to receive video data comprising a sequence of video frames that includes a current frame and one or more preceding frames captured by a video capture device that functions as a camera of a portable electronic device. In certain examples, the code is executable to determine one or more camera motion compensation adjustments to apply to the one or more preceding frames of the sequence based on one or more non-imaging device motion sensor measurements for the video capture device and to generate a sequence of camera-motion compensated preceding frames by applying the one or more camera motion compensation adjustments to the preceding frames of the sequence. The code, in various examples, is executable to temporally denoise the current frame by applying a predetermined video denoising process to one or more of the camera-motion compensated preceding frames which have an overlapping temporal history with the current frame.

BRIEF DESCRIPTION OF THE DRAWINGS

A more particular description of the examples briefly described above will be rendered by reference to specific examples that are illustrated in the appended drawings. Understanding that these drawings depict only some examples and are not, therefore, to be considered to be limiting of scope, the examples will be described and explained with additional specificity and detail through the use of the accompanying drawings, in which.

DETAILED DESCRIPTION

As will be appreciated by one skilled in the art, aspects of the disclosure may be implemented as a system, a method, and/or a program product. Accordingly, examples may take the form of an entirely hardware implementation, an entirely software implementation (including firmware, resident software, micro-code, etc.) or an implementation combining software and hardware aspects that may all generally be referred to herein as a "circuit," "module" or "system." Furthermore, examples may take the form of a program product implemented in one or more computer readable storage devices storing machine-readable code, computer readable code, and/or program code, referred hereafter as code. The storage devices may be tangible, non-transitory, and/or non-transmission. In certain examples, the storage devices only employ signals for accessing code.

Various of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in code and/or software for execution by various types of processors. For example, an identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module or controller.

Indeed, a module of code or may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device.

Code for carrying out operations for examples may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). It may be noted that as used herein, the term "computer" may refer to any type or form of information handling device unless otherwise clear from context.

Reference throughout this specification to "one example," "an implementation," or similar language means that a particular feature, structure, or characteristic described in connection with the example is included in at least one implementation. Thus, appearances of the phrases "in one example," "in an example," and similar language throughout this specification may, but do not necessarily, all refer to the same example or implementation. Similarly, select aspects of the disclosure which are "according to one or more examples of the present disclosure" means that the selected aspects may be present in at least one example, may be present in more than one example, and may be present in all examples.

The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates examples of one or more of the listed elements, with "A and/or B" indicating examples of element A alone, element B alone, or elements A and B taken together. Likewise, as used herein, the phrase "at least one of" indicates examples of one or more of the listed elements, with "at least one of A and B" indicating examples of element A alone, element B alone, or elements A and B taken together. In other words, with respect to listed elements, the terms "and/or," and "at least one of" indicate examples of any of the listed elements alone as well as examples with any combination of the listed elements.

Furthermore, the described features, structures, or characteristics of the examples may be combined in any suitable manner. In the following description, numerous specific details are provided, such as examples of programming, software modules, user selections, network transactions, database queries, database structures, hardware modules, hardware circuits, hardware chips, etc., to provide a thorough understanding of examples. One skilled in the relevant art will recognize, however, that examples may be practiced without one or more of the specific details, or with other methods, components, materials, and so forth. In other instances, well-known structures, materials, or operations are not shown or described in detail to avoid obscuring aspects of an example.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other information handling device to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, an information processing device, or other device to function in a particular manner, such that the instructions stored in the storage device produce an article of manufacture including instructions which implement the function/act specified in the schematic flowchart diagrams and/or schematic block diagrams block or blocks.

The code may also be loaded on to a computer, an information processing device, or other device, to cause a series of operational steps to be performed on the computer, or information handling device to produce a computer implemented process such that the code which executes on the computer, the information processing device, or the other device, provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements. Reference numbers in the figures may include a base number and/or a base number followed by a lowercase letter to refer to different individual elements. A reference to a base number may refer to various elements of the group of elements having the base number including those elements referenced by a base number followed by a lowercase letter, unless otherwise clear from the context.

By way of introduction, use of video has become more prevalent. At the same time, video image capture resolution has increased. Yet many of the noise reduction tools that are available for digital still photography are unsuitable for denoising of video, especially for portable electronic devices. Furthermore, some video denoising techniques (including those which include motion compensation as a first step) may utilize optical flow estimation to attempt to find pixel-wise motions between consecutive images to reduce gaps in temporal coherency and flickering, thus presenting additional challenges for denoising of video.

Whether video denoising is performed using existing motion estimation algorithms or machine learning, such video denoising and motion compensation may be performed predominantly or entirely in the image domain and may be computationally intensive or may require capabilities that exceed the built-in video processing capabilities of portable electronic devices or may incur a processing delay experienced as a latency in the video which may be problematic for certain applications.

Accordingly, the systems, apparatuses, and methods of the present disclosure address these and similar issues by providing an improved device motion aware denoising that makes camera motion compensation adjustments using non-imaging device motion sensor measurement, thereby improving the performance of video denoising systems.

The advantages of the systems, apparatuses, and methods disclosed herein, are particularly notable for various types of portable electronic devices such as laptops, tablets, smartphones, action cameras, and so forth, which are likely to be subjected to significant device motion (e.g., camera motion).

Figure 1:
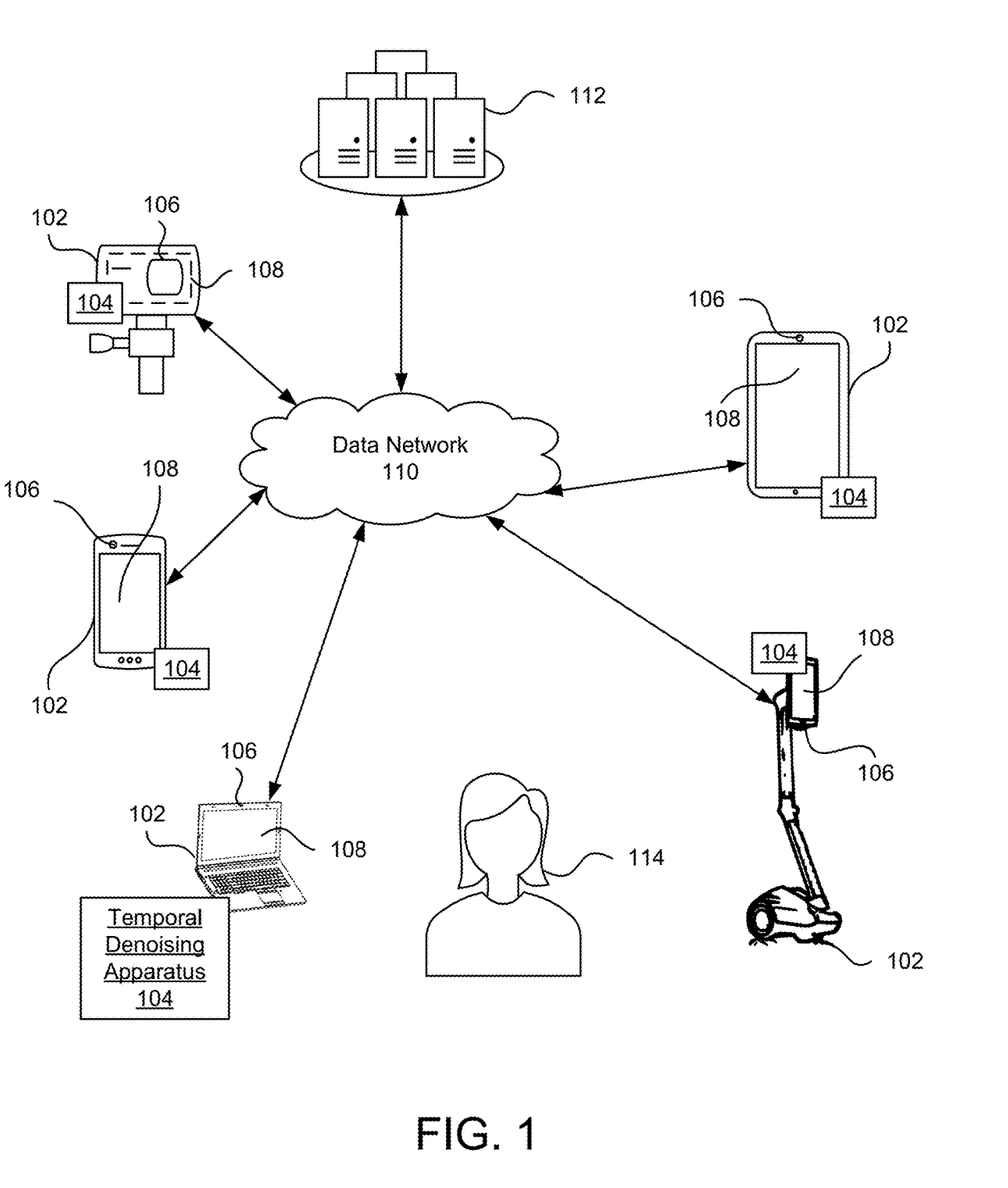
FIG. 1 is a schematic block diagram illustrating a system for device motion aware temporal denoising, according to one or more examples of the present disclosure.

FIG. 1 is a schematic block diagram illustrating a system 100 for device motion aware temporal denoising, according to one or more examples of the present disclosure. In various examples, the system 100 includes one or more portable electronic devices 102, one or more video denoising apparatuses 104, one or more video capture devices 106, one or more displays 108, one or more data networks 110, and one or more servers 112. The system 100 and various components of the system 100 may be used by one or more subjects 114.

In certain example, even though a specific number of portable electronic devices 102, video denoising apparatuses 104, video capture devices 106, displays 108, data networks 110, and servers 112, are depicted as illustrated in FIG. 1, one of skill in the art may recognize, in light of this disclosure, that any number of portable electronic devices 102, video denoising apparatuses 104, video capture devices 106, displays 108, data networks 110, and servers 112, may be included in the system 100.

In certain examples, the system 100 includes one or more portable electronic devices 102, such as for example laptops, tablets, smartphones, desktops, workstations, and so forth. In some examples the portable electronic device 102 includes a processor (e.g., a central processing unit ("CPU"), a processor core, a field-programmable gate array ("FPGA") or other programmable logic, an application-specific integrated circuit ("ASIC"), a controller, a microcontroller, and/or another semiconductor integrated circuit device), a volatile memory, and/or a non-volatile storage medium, and/or the like.

In various examples, one or more of the portable electronic devices 102 is configured to capture an image of a subject 114 such as a user to facilitate capturing and exchanging video data (e.g., in a video conference) with another portable electronic device utilized by a remote user.

In certain examples, the portable electronic device 102 includes a video capture device 106. As used herein the term "video capture device" may refer to a camera and the term "camera" may refer a video capture device. In one or more examples, the motion for the video capture device 106 is based on the motion of the portable electronic device as a whole. For example, an action camera is one example of a portable electronic device that includes a video capture device 106 where the motion for the video capture device 106 is based on the motion of the action camera body as a whole. In other words, in such examples, the video capture device 106 is fixed relative to the body or base of the portable electronic device but both the portable electronic device and the moveable video capture device are movable relative to an external subject, foreground, and background.

In some examples, the portable electronic device 102 includes a video capture device 106 where the motion for the video capture device 106 is based on the motion of one component of the portable electronic device (such as a lid or a moveable camera mount) relative to another component of the portable electronic device (such as a base or a stand). Examples of portable electronic devices 102 with video capture devices 106 where the measured motion is relative to another component of the portable electronic device 102 include certain laptop computers, hybrid laptops, foldable tablets and/or smartphones, and portable robotic video capture systems or security cameras that pan and tilt.

In various examples, a portable electronic device 102 includes one or more displays 108. In certain examples, the portable electronic device 102 includes one or more user interfaces, such as for example, a touchscreen display, a physical keyboard, a mouse, a voice control, or similar user interface devices or accessories. The portable electronic devices 102 include one or more network interfaces such as for example a wireless connection between the portable electronic device 102 and a cloud based network storage location.

In a depicted example, the system 100 includes a video denoising apparatus 104 for device motion aware temporal denoising. In some examples, the video denoising apparatus 104 is implemented in the portable electronic device 102. In some examples, some portions of the video denoising apparatus 104 are implemented as a software program that runs on a processor of the portable electronic device 102. In various examples, certain portions of the video denoising apparatus 104 may be implemented as a hardware/firmware implementation, or another combination of hardware and software.

In some examples, the video denoising apparatus 104 receives video data comprising a sequence of video frames that includes a current frame and one or more preceding frames captured by a video capture device that functions as a camera of a portable electronic device 102. The video denoising apparatus 104 is described in more detail below with respect to FIG. 2.

In various examples, the system 100 includes one or more displays 108 that display various types of data including video content. In certain examples, the display 108 is included in or coupled to the housing of the portable electronic device 102 that also includes the video capture device 106. In some examples, a display 108 may separate from and in data communication with the portable electronic device 102 and/or the video denoising apparatus 104. Certain examples of the display 108 are described in more detail with respect to FIG. 2.

In certain examples, the system 100 includes a data network 110 and the portable electronic devices 102 are communicatively coupled to one or more other portable electronic devices 102 and/or to one or more servers 112 over the data network 110, described below. The portable electronic devices 102, in a further example, may include processors, processor cores, specialized processors such as AI accelerators, GPUs, and so forth that execute various programs, program code, applications, instructions, functions, and/or the like. In some examples, the portable electronic devices 102 use the data network 110 to download application-specific software such as video capture software, video device adjusting software, drivers, and other software that may benefit from or assist with device motion aware temporal denoising.

The data network 110, in one example, includes a digital communication network that transmits digital communications. The data network 110 may include a wireless network, such as a wireless cellular network, a local wireless network, such as a Wi-Fi network, an ad hoc network, and/or the like. The data network 110 may include a wide area network ("WAN"), a local area network ("LAN"), an optical fiber network, the internet, or other digital communications network. The data network 110 may include two or more networks. The data network 110 may include one or more servers, routers, switches, and/or other networking equipment. The data network 110 may also include one or more computer readable storage media, such as a hard disk drive, an optical drive, non-volatile memory, RAM, or the like.

The wireless connection may be a mobile telephone network. The wireless connection may also employ a Wi-Fi network, including for example, Wi-Fi networks similar to any one of the Institute of Electrical and Electronics Engineers ("IEEE") 802.11 standards. All standards and/or connection types include the latest version and revision of the standard and/or connection type as of the filing date of this application.

The one or more servers 112, in one example, may be embodied as blade servers, mainframe servers, tower servers, rack servers, and/or the like. The one or more servers 112 may be configured as mail servers, web servers, application servers, FTP servers, media servers, data servers, web servers, file servers, virtual servers, and/or the like. The one or more servers 112 may be communicatively coupled (e.g., networked) over a data network 110 to one or more portable electronic devices 102. The servers 112 may comprise back-end servers for video processing, cognitive services, video integration, and/or the like.

Although the system 100 describes a data network 110 and servers 112, in various embodiments the video denoising apparatus 104 is designed to function without requiring an active connection or any connection to the data network 110 or the servers 112 to implement the feature of the video denoising apparatus 104 being device motion aware.

Figure 2:
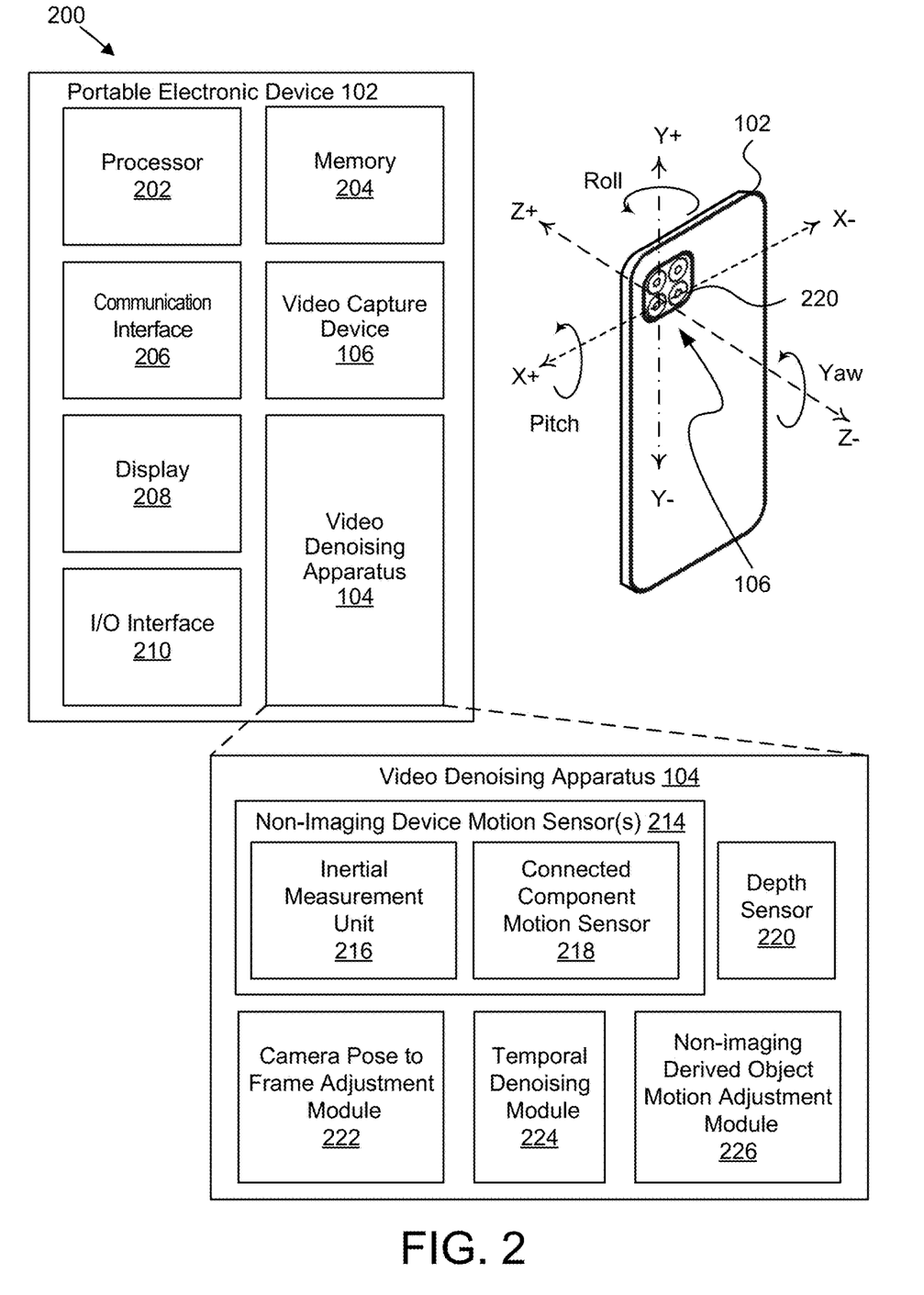
FIG. 2 is a schematic block diagram depicting an apparatus for device motion aware temporal denoising, according to one or more examples of the present disclosure.

FIG. 2 is a schematic block diagram depicting an apparatus 200 for device motion aware temporal denoising, according to one or more examples of the present disclosure.

For various of the video parameters, the apparatus 200 may access and/or update device specific parameters for the particular portable electronic device 102 that may include values, ranges, maximums, minimums, thresholds, matching values, categories, types, or expressions or combinations of the same, which are determined by an equipment manufacturer, software manufacturer, a user, or by machine learning based on optimization algorithms that may include usage information, quality information, and so forth. It may be noted that as used herein, the term "range" is used to refer to one or more values, ranges, maximums, minimums, thresholds, matching values, categories, types, or expressions or combinations of the same, or similar quantitative indicators.

In various examples, the apparatus 200 includes one or more instances of a local portable electronic device 102, such as for example, the local portable electronic devices 102 which are depicted in FIG. 1 as an action camera, a smartphone, a laptop, a robot camera (e.g., a telepresence robot), and a tablet, although various types of portable electronic devices 102 may include a portion or all of the video denoising apparatus 104.

In one or more examples, the apparatus 200 includes a processor 202, a memory 204 that is accessible by the processor 202, a communication interface 206, a display 208, an I/O interface 210, and a video denoising apparatus 104. It may be noted by a person of ordinary skill in the art that the portable electronic devices 102 may include other components for performing various functions consistent with the type of portable electronic device 102 being used (e.g., laptop, desktop, smart phone, tablet, and so forth).

In some examples, the apparatus 200 includes or is configured to connect to one or more video capture devices 106. As used herein, the terms "video capture device" or camera may be used to refer to any imaging device configured to capture, record, and/or communicate sequences of video images within visible, infrared, or ultraviolet light.

In various implementations, the one or more video capture devices 106 are integrated in the same housing as the portable electronic device 102. For example, a portable electronic device 102 that is a smart phone, a tablet, or a convertible or hybrid laptop, may include one or more first video capture devices 106 that are front-facing cameras and one or more second video capture devices 106 that are back-facing cameras. In some examples, portable electronic devices 102 such as smartphones may include multiple video capture devices 106 that act as back-facing cameras also sometimes referred to as rear-facing cameras. For example, FIG. 2 depicts an isometric view of a portable electronic device 102 that is a smartphone that includes three video capture devices 106 configured respectively as a main camera, an ultra-wide camera, a macro camera (starting at the bottom left and ordered clockwise), The depicted portable electronic device 102 also includes a depth sensor 220 which, in some examples, may be implemented as a depth camera.

In some examples, the apparatus 200 utilizes the memory 204 to access program code and/or data. The memory 204 may include volatile and/or nonvolatile memory and may include memory that may be coupled or decoupled to the information handling device such as a microSD card solid-state drive, or similar storage device. In various examples, the portable electronic device 102 accesses memory 204 that is virtual memory stored in a storage area network, a remote server, cloud-based data storage, or other discrete or distributed network storage devices such as for example storage devices accessible by the one or more servers 112 depicted in FIG. 1.

In various examples, the apparatus 200 includes a communication interface 206. The communication interface 206 may include hardware circuits and/or software (e.g., drivers, modem, protocol/network stacks) to support wired or wireless communication between the portable electronic device 102 and another device or network, such as the data network 110. The wireless connection may include a mobile telephone network. The wireless connection may also employ a Wi-Fi network based on any one of the Institute of Electrical and Electronics Engineers (IEEE) 802.11 standards. Alternatively, the wireless connection may be a Bluetooth® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

In some examples, the apparatus 200 includes an I/O interface 210 that is configured communicate with accessories, peripheral devices, input devices, output devices, and so forth. In certain examples, the I/O interface 210 may support various industry standards, such as for example, universal serial bus (USB), USB 2.0, USB 3.0, USB3Vision®, USB 3.1, USB 3.2, FireWire®, HMDI, CameraLink, GigE, and so forth which may be used to communicate with devices, peripherals, accessories, and so forth. The foregoing lists of interfaces with a wired or wireless is not intended to be an exhaustive list of the interfaces that may be used in implementing the apparatus 200 and is intended to show that certain interfaces can be used advantageously to implement the system 100 and/or the apparatus 200.

In certain examples, the apparatus 200 includes an audio output such as for example a loudspeaker, an interface to Bluetooth® or similar wireless speaker, etc. In certain examples, the audio output projects an audio portion of the video content. In various examples, the apparatus 200 includes an audio input, such as for example a microphone that receives audio input, such as for example, voice commands from a user. In some cases, the audio input is implemented as part of the more or more video capture devices 106.

In various examples, the memory 204 stores code executable by the processor 202 to perform device motion aware video. Further details about current and preceding video frames and about applying the camera motion compensation adjustments to the preceding frame are described below with respect to examples depicted in FIGS. 3-7.

In one or more examples, the apparatus 200 includes a video denoising apparatus 104 that includes one or more non-imaging device motion sensors 214.

The non-imaging device motion sensors 214 may include an inertial measurement unit 216 or a connected component motion sensor 218 or both. In various examples, the video denoising apparatus 104 may further include a camera pose to frame adjustment module 222, and a temporal denoising module 224. In some examples, the video denoising apparatus 104 includes a depth camera which serves as a depth sensor 220.

In various example implementations, the apparatus 200 performs device motion aware temporal denoising using the processor 202 and the memory 204 which stores code that is executable by the processor to receive video data that includes a sequence of video frames that includes a current frame and one or more preceding frames captured by a video capture device 106 that functions as a camera of a portable electronic device 102. In one or more examples, the processor 202 determines one or more camera motion compensation adjustments to apply to the one or more preceding frames of the sequence based on one or more non-imaging device motion sensor measurements for the video capture device. For example, in certain examples, the processor 202 reads the one or more non-imaging device motion sensor measurements from one or more non-imaging device motion sensors 214 that are included in or with the portable electronic device 102.

In examples, the processor 202 receives video data comprising a sequence of video frames that includes a current frame and one or more preceding frames captured by a video capture device that functions as a camera of a portable electronic device. Temporal noise reduction in a current frame may be performed by comparing the pixels of the current frame with corresponding pixels of the one or more preceding frames of a predetermined number of frames in a sequence and based on information from the comparison filtering or smoothing unexpected pixel differences (e.g., noise) that occurred over the time period of the sequence.

Unlike temporal denoising which uses image processing uses flow estimation or other motion compensation processing performed in the image domain to detect systemic frame-to-frame differences which indicate device motion such as camera should not be processed as noise, various examples of the video denoising apparatus 104 and corresponding methods and systems described herein, determine one or more camera motion compensation adjustments to apply to the one or more preceding frames of the sequence based on one or more non-imaging device motion sensor measurements for the video capture device. The video denoising apparatus 104 then generates a sequence of camera-motion compensated preceding frames by applying the one or more camera motion compensation adjustments to the preceding frames of the sequence before performing temporal denoising.

Herein, the term "non-imaging device motion sensors" may be understood refer to sensors that do not rely on optically or image processing of images to determine device motion and/or orientation of the portable electronic device. Such sensors may be used to measure camera motion such as relative changes in camera pose, where the term "camera pose" may be understood to refer to the position and orientation of a camera with respect to a reference coordinate system.

Certain examples of non-imaging device motion sensors 214 may include inertial measurement units (IMUs) 216 which may include a 3-axis accelerometer, a 3-axis gyroscope, and in some examples may further include a 3-axis magnetometer. Various IMUs are micro electromechanical systems (MEMS) that can be integrated into portable electronic devices 102 such as the smartphones, laptop computers, hybrid laptops, foldable tablets, portable robotic video capture systems, smartwatches, and so forth, such as described above with respect to FIG. 1.

In some examples, the non-imaging device motion sensors 214 may include one or more connected component motion sensors 218 such as hinge angle sensors. The term connected component motion sensors, as used herein refers to a non-imaging sensor that provides a measurement (e.g., in degrees) between two integral parts of the device such that changes in the measurement over the time period of the sequence of video frames indicates device motion. For example, as described in more detail below with respect to FIGS. 6 and 7, a portable electronic device 102 that is a laptop, a hybrid laptop/table, a foldable smartphone, or a portable robotic video capture system, may include connected component motion sensors 218 such as hinge angle sensors, that can detect movement, for example, of the built-in webcam, front-facing camera, robotic articulation joints, or action camera mounts (to a tripod, helmet mount, chest mount, and so forth) based on changes in hinge angle measurements over the time period of the frames in the video sequence.

In some examples, the video denoising apparatus may include a depth sensor 220 or obtain measurements from a depth sensor 220 that enables the processor 202 to determine an estimated distance between the video capture device that functions as a camera for the portable electronic device and a target object within one or more video frames of the sequence. In such examples, the processor 202 may use the estimated distance between the camera and a target object to determine a non-imaging derived angular rotation measurement of the camera to perform one or more camera rotation compensation adjustments to the preceding frames.

In certain examples, a depth sensor 220 or depth sensor measurements may be omitted by programming the processor to use a predetermined range of estimated distances between a camera and a target object based on application context. For example, in the context of a laptop webcam that rotates about a lid hinge and a user's face, a predetermined distance range of about 40 cm to 60 cm may be a suitable default to provide device motion aware temporal denoising for video conferencing applications.

In various examples, the video denoising apparatus 104 includes a camera pose to frame adjustment module 222 that determines one or more camera motion compensation adjustments to the preceding frames of the sequence based on differences in a sequence of camera pose measurements corresponding respectively to the preceding frames relative to a camera pose measurement of the current frame.

The camera pose to frame adjustment module include code read by the processor 202 that causes the processor 202 to program, perform, and/or read sensor measurements using the non-imaging device motion sensors 214. Certain portions of the camera post to frame adjustment module may be implements via application programming interface (API) calls to device motion APIs built into an operating system such as Android, IOS, or Windows operating systems for portable electronic device. In some examples, video denoising apparatus includes predetermined camera pose difference to 2D projected subject distances base on a measured or assumed camera to subject distance.

In certain examples, the one or more camera motion compensation adjustments include an x-shift and a y-shift of image pixels of the preceding frames of the sequence to improve alignment of the image pixels of each respective preceding frame relative to corresponding image pixels of the current frame based on the non-imaging device motion sensor measurements. Although certain video stabilization processes use motion data to help align a subject frame to-frame, these processes operate differently. In such stabilization process, the resultant video is a cropped version of the input frame, where the position of the crop rectangle changes from frame-to-frame in order to keep the subject steady.

Because the objectives of temporal denoising and image stabilization are different, in various examples, the processor 202 executes code from the temporal denoising module 224 to temporally denoise the current frame by applying a predetermined video denoising process to the current frame using portions of the camera-motion compensated preceding frames which have an overlapping temporal history with the current frame. Even though there may be slight errors frame to frame in the measured device motion measurements, the edges in the image do not need to align perfectly to provide an acceptable level of temporal denoising.

In certain examples, the video denoising apparatus 104 may include a measured object motion adjustment module 226 that causes the processor 202 to receive one or more non-imaging derived object motion measurements of an object within a field of view for the video capture device 102 and to apply one or more non-imaging derived object motion compensation adjustments to respective portions of the preceding frames of the sequence corresponding to image pixels for the object in the current frame in response to determining that the one or more non-imaging sense object motion measurements are below a predetermined motion threshold.

The feature of determining non-imaging sensed object motion measurements may be performed by the non-imaging derived object motion adjustment module receiving frame to frame 3D position coordinates of an object within a field of view of the video capture device 106. The changes in 3D position coordinates may be transformed to generate 2D projections of the object motion. However, such implementations would require more image processing to recognize the object and to make and adjustment to the 2D projection of the object within the frame.

If the 2D projected distance of the object motion between adjacent frames exceeds a predetermined threshold, the computational time and resources to perform the object motion compensation adjustments may be significant and thus the non-imaging sensed object adjustment module may be configured to only perform object pixel shifts based on non-imaging sensed measurements where the perceived denoising improvements would be relatively small.

To illustrate certain problems with existing video denoising systems that lack device motion awareness and to emphasize the advantages of the disclosed systems, apparatuses, and methods for performing device motion aware temporal denoising, FIG. 3, FIGS. 4A, 4B, 4C, and FIGS. 5A, 5B are instructive.

Figure 3:
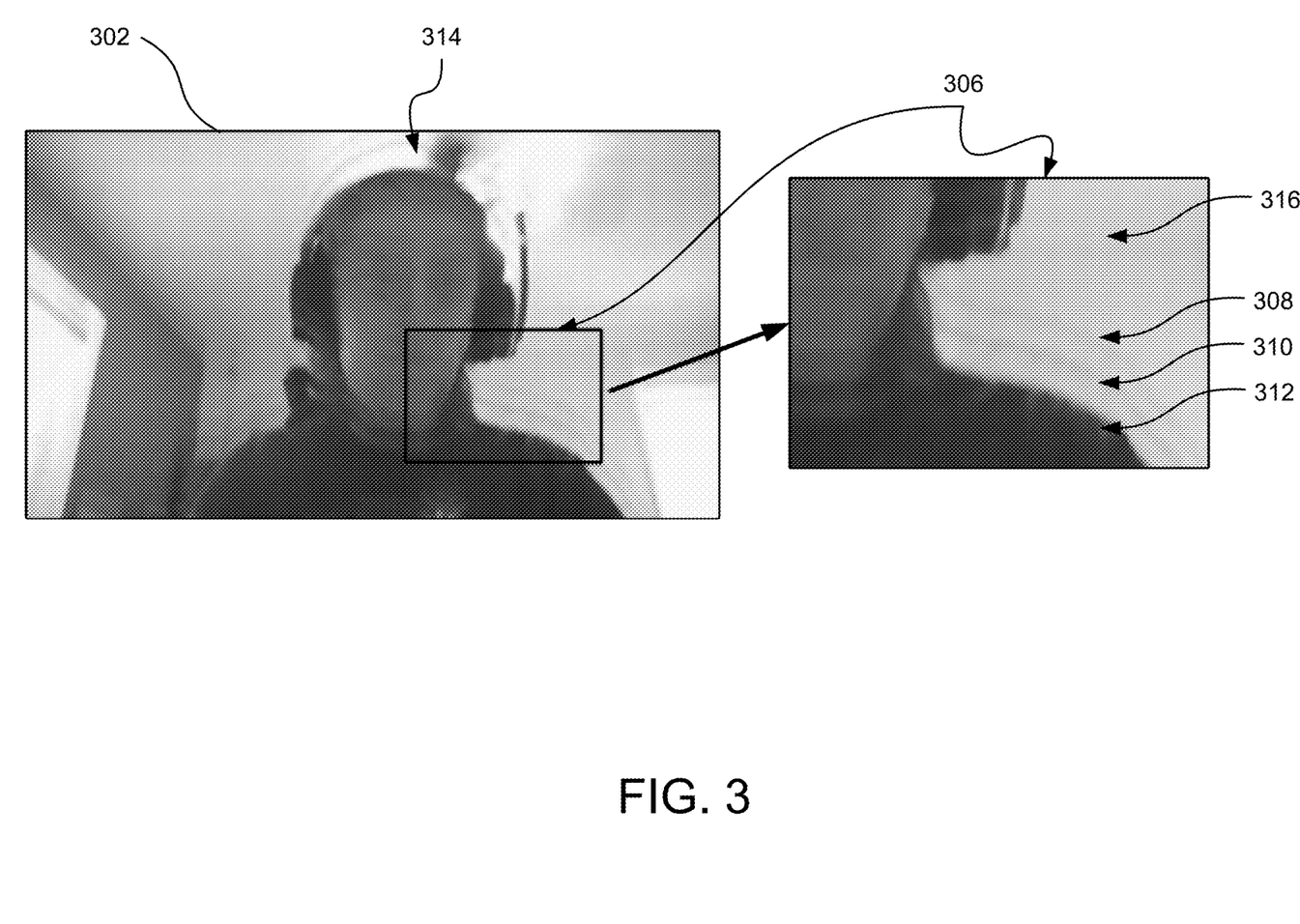
FIG. 3 depicts a current video frame to which temporal denoising has been applied without the benefit of device motion aware temporal denoising, according to one or more examples of the present disclosure.

FIG. 3 depicts a current video frame 302 to which temporal denoising has been applied based on two preceding video frames where camera motion occurred without the benefit of device motion aware temporal denoising, according to one or more examples of the present disclosure. The denoised current video frame 302 includes an image of a subject 314 (also sometimes referred to as a foreground object) (which, in this example, is a man with a headset). In the depicted frame, temporal denoising of a raw video was performed using a predetermined temporal denoising process, Some examples of suitable temporal based denoising methods include discrete wavelet transform (DWT) based denoising, temporal bilateral filter, temporal Kalman filtering, although many video temporal video denoising approaches and combinations thereof may be utilized.

A zoomed-in inset 306 of a portion of the video frame shows that performing the video denoising of the current frame based on two preceding video frames where camera motion occurred, where the denoising was performed using an apparatus that does not include mechanisms to make the denoising device motion aware, imaging artifacts such as the faint or "ghost" shoulder outlines 308, 310 are produced based on two preceding frame images being captured with a dark contrasting foreground edge 312 of the subject 314 against a light background 316 while the camera was in motion frame-to-frame. Unintended creation of such artifacts may in many cases be more distracting or otherwise problematic than the noise which the temporal denoising was intended to reduce.

Furthermore, certain temporal video denoising methods implement edge-preserving smoothing which is an image processing technique that smooths away noise textures while retaining sharp edges. However, if the video capture device is moving during the video frame capture, the use of edge preserving smoothing may exacerbate the appearance of such artifacts or outlines (sometime referred to a ghost images).

Where video workstations are used to perform image processing on prerecorded video sequences, motion compensation processing but various motion compensation algorithms require multiple image block operations and complex image processing operations to be performed in the imaging domain and often such processing takes a greater amount of time and computing resources to perform than may be available in a typical portable electronic device.

Advantageously, by using non-imaging device motion sensors 214 that can measure camera motion frame to frame without the need to perform image processing, a significantly better outcome for many types of temporal video denoising can be achieved using less processing time and fewer computing resources.

Figure 4A:
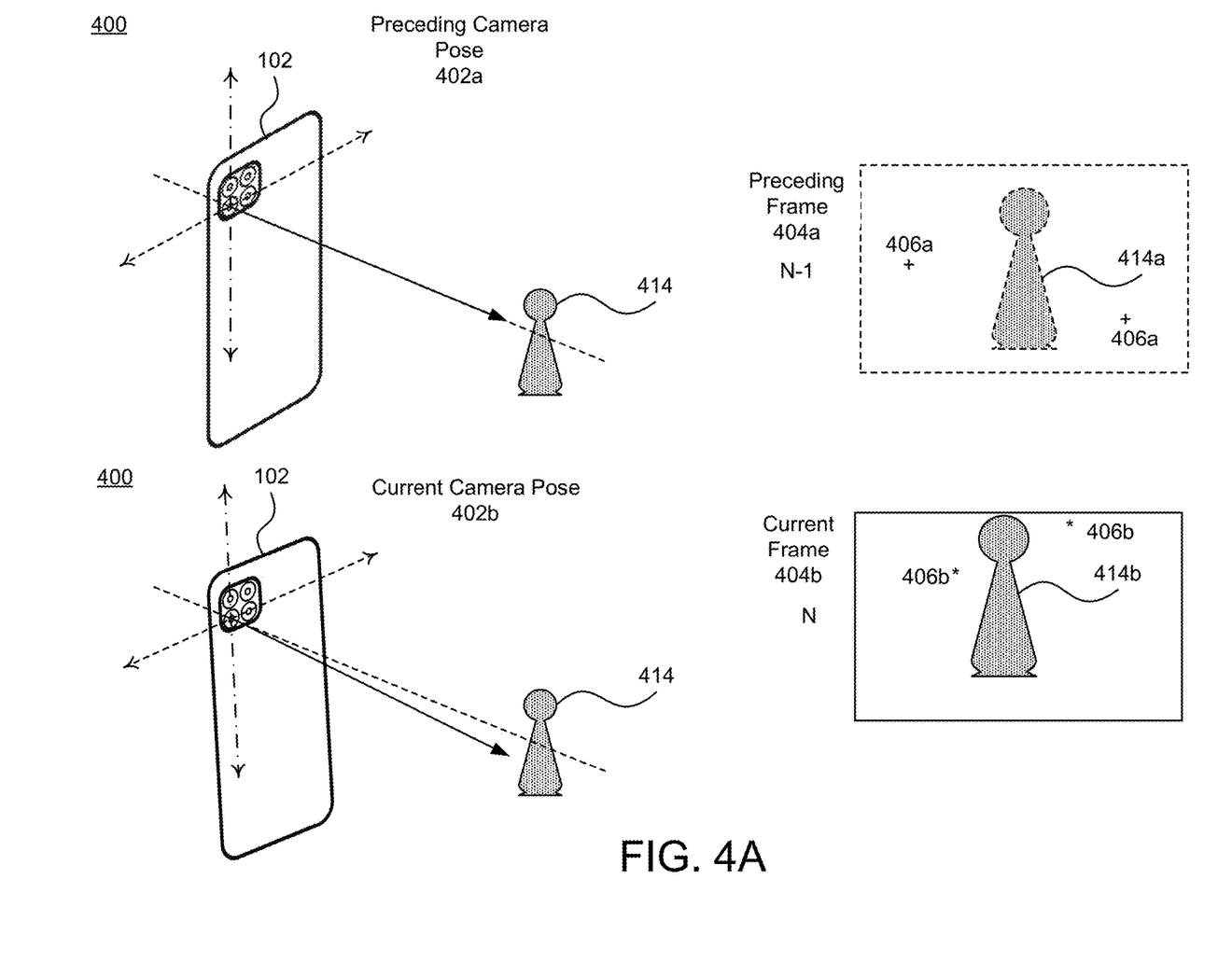
FIG. 4A depicts device motion exemplified as a change in camera pose and a corresponding change in subject position within a sequence of video frames, according to one or more examples of the present disclosure.

FIG. 4A depicts an apparatus 400 where device motion exemplified as a change in camera pose and a corresponding change in subject image position within a sequence of video frames, according to one or more examples of the present disclosure.

In various implementations, a portable electronic device 102 such as a smartphone, includes one or more video capture devices 106 that serve as a back facing camera for the portable electronic device 102. As depicted in a first orientation referred to as prior camera pose 402a, a video capture device 106 that serves as a main camera is oriented such that an image of a subject 314 (e.g., a pawn) is centered within a first video frame referred to as preceding video frame 404a (also referred as frame N−1). The preceding frame 404a also depicts noise artifacts 406a (illustrated as + symbols) that, due to the random nature of noise, are likely to be in different frame locations than noise artifacts 406b depicted as asterisk symbols in current frame 404b. Thus, when the temporal denoising is applied to a small and predetermined number of preceding frames e.g., N−1, N−2, N−3 the averaging, smoothing or other filtering of these noise artifacts 406a, 406b, etc., will reduce the perceptible noise in the current frame 404b.

As depicted in a second orientation referred to as current camera pose 402b, the video capture device 106 that serves as the main camera has been moved slightly (e.g., rotated down and to the right) so that it is oriented such that an image of the subject 314 (e.g., the pawn) is centered within a second video frame referred to as current video frame 404b (also referred as frame N). This camera motion causes the subject (e.g., foreground object) to appear translated up and to the left relative to the preceding video frame 404a.

Figure 4B:
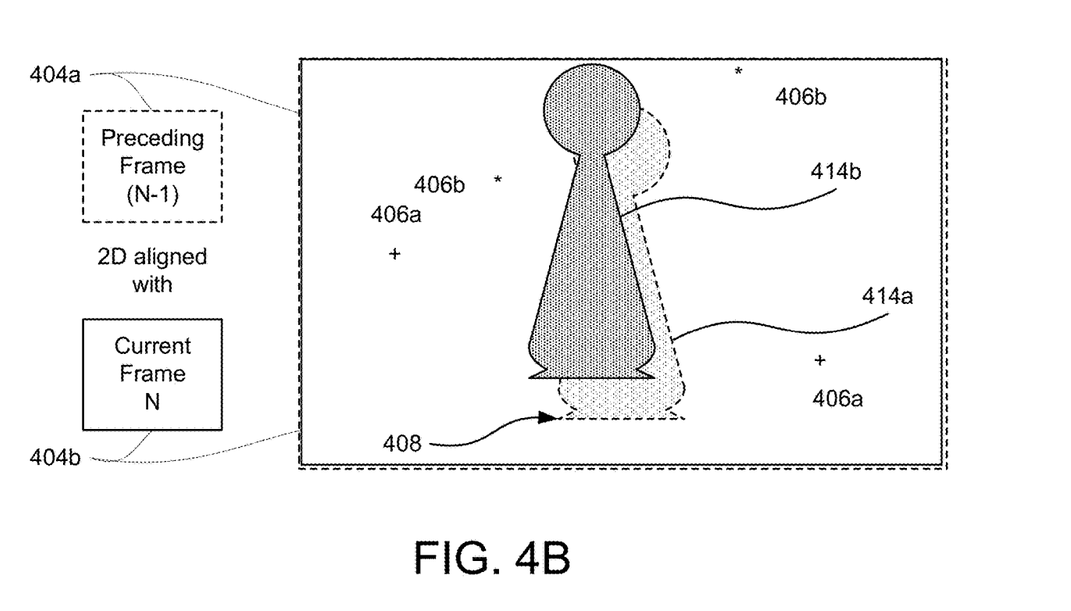
FIG. 4B depicts the potential ghosting artifact effects of device motion when temporal denoising is applied to unadjusted preceding frames aligned with a current frame.

Referring now to FIG. 4B, assuming that video denoising were performed on the sequence of unadjusted video frames, certain ghosting artifacts 408 from portions of the subject images 414a from the one or more preceding frames N−1, N-2, . . . can appear in the current frame similar to the contrasting ghost subject lines seen in FIG. 3.

Figure 4C:
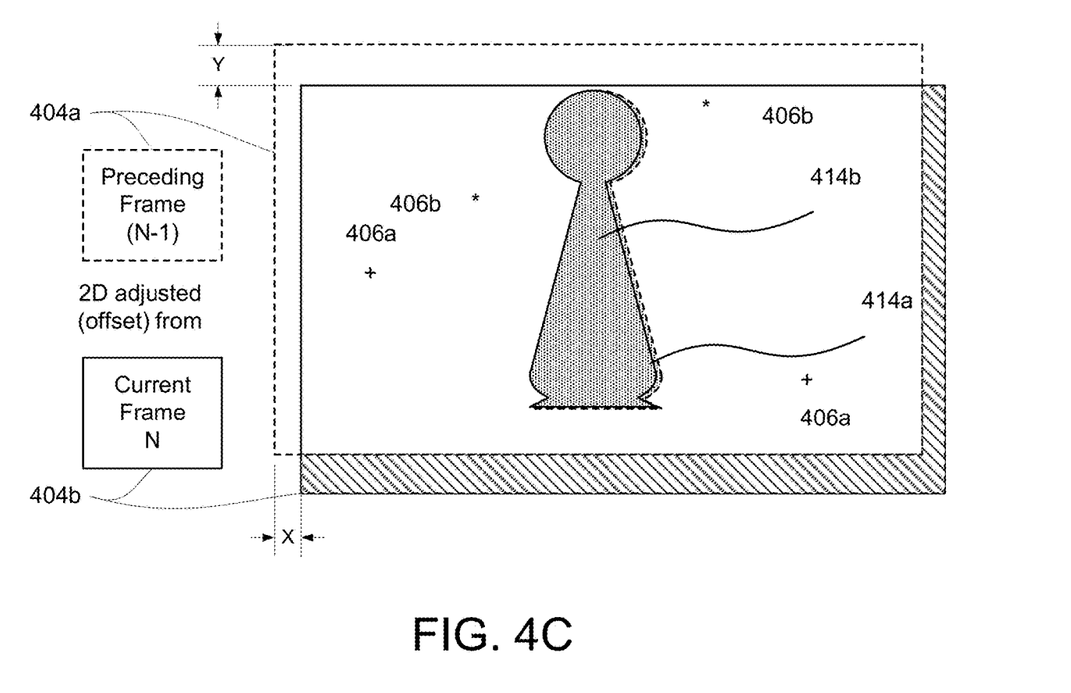
FIG. 4C depicts a sequence of camera motion compensated frames generated by applying camera motion compensation adjustments, according to one or more examples of the present disclosure.

FIG. 4C depicts a sequence of camera motion compensated frames generated by applying camera motion compensation adjustments, according to one or more e0xamples of the present disclosure. As describe above, in some examples, the one or more camera motion compensation adjustments comprise an x-shift and a y-shift of image pixels of the preceding frames of the sequence to improve alignment of the image pixels of each respective preceding frame relative to corresponding image pixels of the current frame based on the non-imaging device motion sensor measurements.

Knowing the motion that occurred at the camera, a camera motion compensation adjustment (e.g., image translation) is made to the preceding image frames to more closely align with the current frame. In this case, the preceding frame is moved up (e.g., a positive y-shift) and to the left (e.g., a negative x-shift). In various examples, the shifts to all the pixels in the frame can be made without the processor 202 having to know the value of any particular set of pixels. Since there are errors in the device motion measurements and/or converting motion to image translation, edges in the image will not align perfectly. Accordingly, some of the current frame has no preceding frame data available for temporal denoising (shaded region).

In other words, some portions of the current frame do not have one or more preceding frames with an overlapping temporal history with the current frame. In such examples, the temporal denoising module 224 may cause the processor 202 to temporally denoise the current frame by applying a predetermined video temporal denoising process to the current frame using portions of the camera-motion compensated preceding frames which do have an overlapping temporal history with the current frame and to perform spatial denoising of those portions of current frame which do not have one or more preceding frames with an overlapping temporal history with the current frame, which may provide a visually smoother peripheral portion of the denoised frame while still avoiding the ghosting artifacts without having to accept image cropping as is done in video stabilization processes that use motion sensor input.

Referring to FIG. 4C, although the position of the noise artifacts 406a has been shifted up and to the left and the position of the subject 414 (e.g., subject images 414a, 414b of the subject 414) has also been shift up and to the left because the frame was shifted up and to the left, when the temporal denoising is applied to a small and predetermined number of preceding frames e.g., N-1, N-2, N-3 the averaging, smoothing or other filtering of these noise artifacts 406a, 406b, etc., will reduce the perceptible noise in the current frame 404b. Beneficially however, because the position of the subject image 414a of the preceding frame is now generally aligned with the subject image 414b of the current frame, there is little or no noticeable presence of ghosting artifacts in FIG. 4C introduced by the temporal denoising process.

Figure 5A:
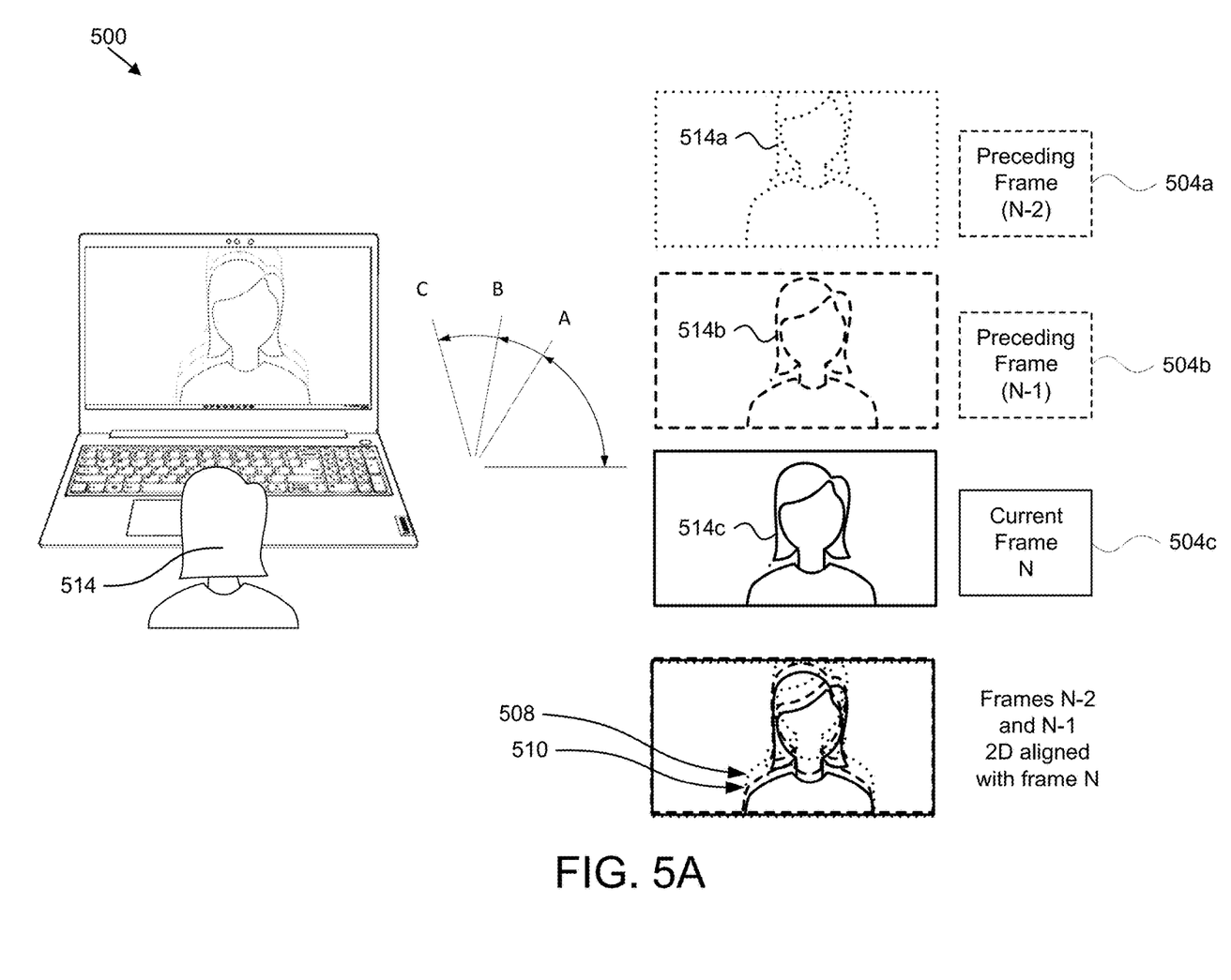
FIG. 5A depicts a system with another sequence of video frames with device motion exemplified as a change in camera pose with a corresponding change in 2D projected subject position with the sequence of frames and temporal denoising is applied without the benefit of device motion aware temporal denoising, according to one or more examples of the present disclosure.

FIG. 5A depicts a system 500 with another sequence of video frames with a subject 514 where device motion is illustrated as a change in camera pose (from angular position A to position B to position C with a corresponding change in 2D projected subject image position with the sequence of preceding frames 504a, 504b and temporal denoising is applied without the benefit of device motion aware temporal denoising, according to one or more examples of the present disclosure. As can be seen in preceding frame 504a the angle of the camera (e.g., hinge angle 'A') is such that a top portion of the subject image 514a is offscreen. At hinge angle 'B,' measurable device motion has occurred and the subject image 514b appears shifted lower in the frame and the device motion continues to current frame 504c (hinge angle 'C') where the subject image 514c is still lower vertically.

Without the benefit of the device motion aware features as described herein, the, ghosting artifacts 508, 510 may result from the temporal denoising process as previously described.

Figure 5B:
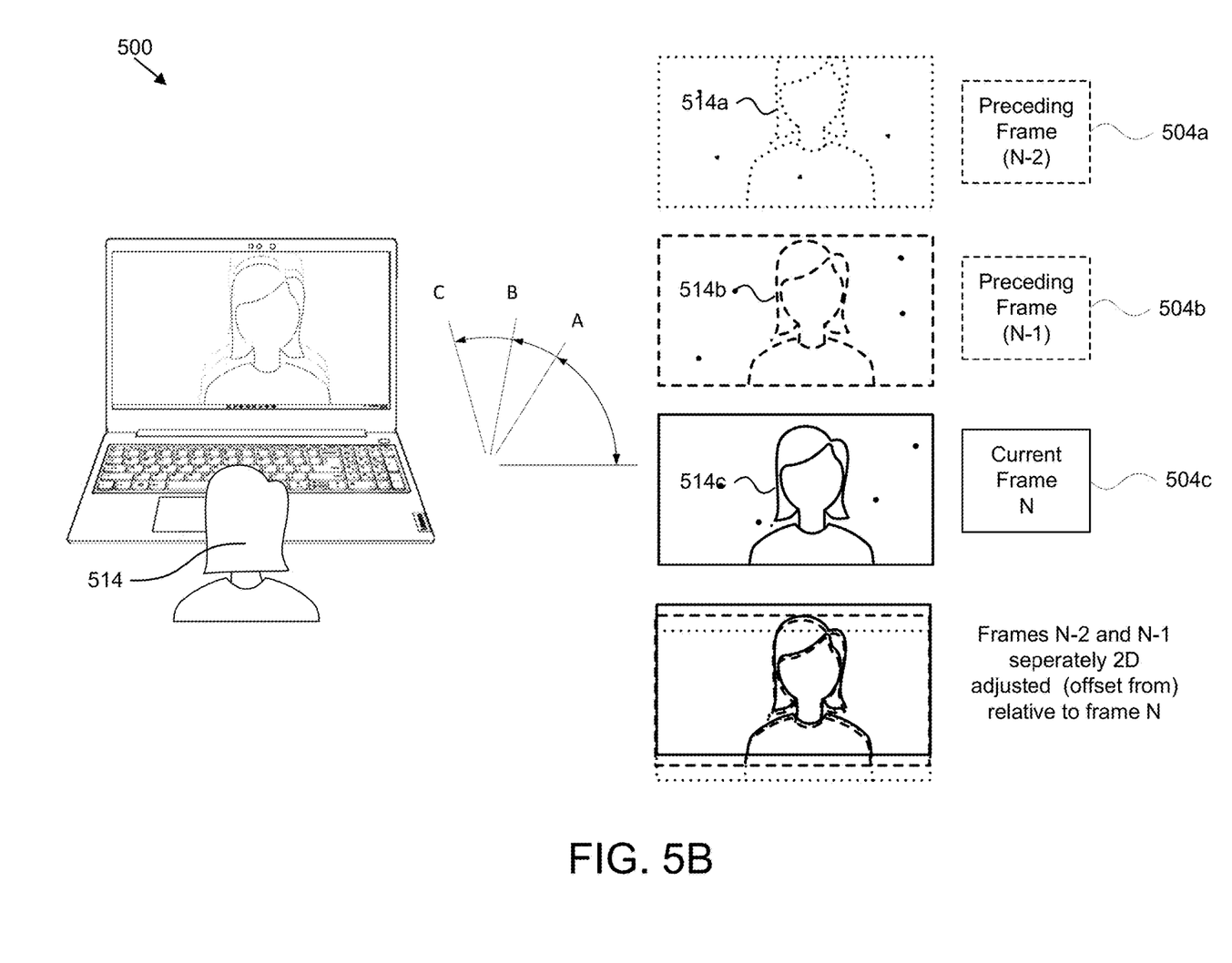
FIG. 5B depicts a further sequence of video frames with device motion exemplified as a change in camera pose with a corresponding change in 2D projected subject position with the sequence of frames and temporal denoising is applied with the benefit of device motion aware temporal denoising, according to one or more examples of the present disclosure.

FIG. 5B depicts the system 500 where device motion awareness has been added such that further sequence of video frames with device motion exemplified as a change in camera pose with a corresponding change in subject position with the sequence of frames and temporal denoising is applied with the benefit of device motion aware temporal denoising, according to one or more examples of the present disclosure. As shown in FIG. 5B because frames N02 and N-1 are separately 2D adjusted prior to performing temporally denoising, the ghosting artifacts 508, 510 which were apparent in FIG. 5A are minimized or eliminated.

Figure 6:
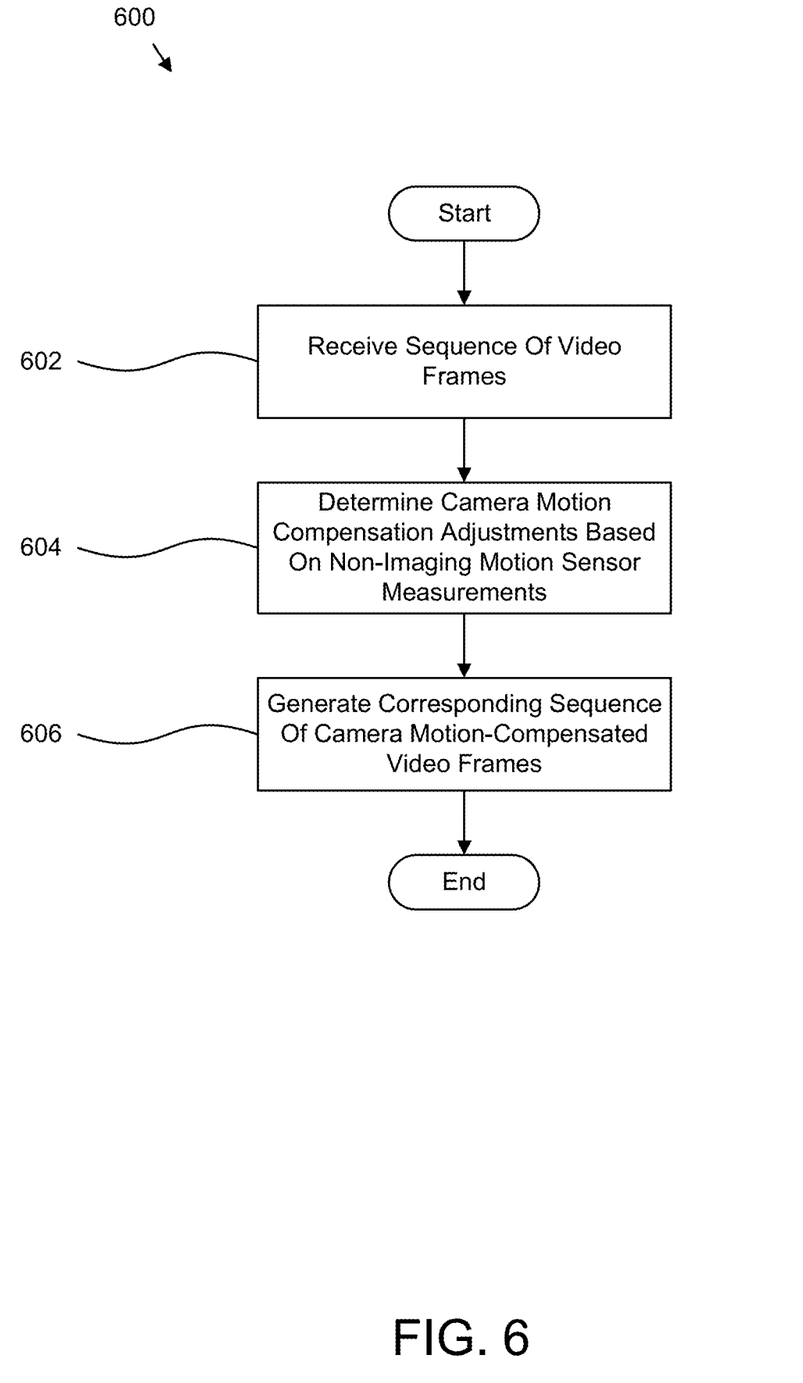
FIG. 6 is a schematic flow chart diagram illustrating a method for device motion aware temporal denoising, according to one or more examples of the present disclosure.

FIG. 6 is a schematic flow chart diagram illustrating a method 600 for device motion aware temporal denoising, according to one or more examples of the present disclosure. In various examples, the method 600 begins and includes receiving 602 video data that includes a sequence of video frames that includes a current frame and one or more preceding frames captured by a video capture device that functions as a camera of a portable electronic device. In certain examples, the method 600 continues and includes determining 604 one or more camera motion compensation adjustments to apply to the one or more preceding frames of the sequence based on one or more non-imaging device motion sensor measurements for the video capture device. In one or more examples, the method 600 further includes generating 606 a sequence of camera-motion compensated preceding frames by applying the one or more camera motion compensation adjustments to the preceding frames of the sequence.

In various examples, the method 600 may be implemented substantially as described above with respect to the functions of the system 100, and the apparatuses 200 and 400, respectively in FIGS. 1, 2, 4a, 5. The method 600 may further include certain features described above with respect to the camera motion compensated frames depicted in FIG. 5B.

Figure 7:
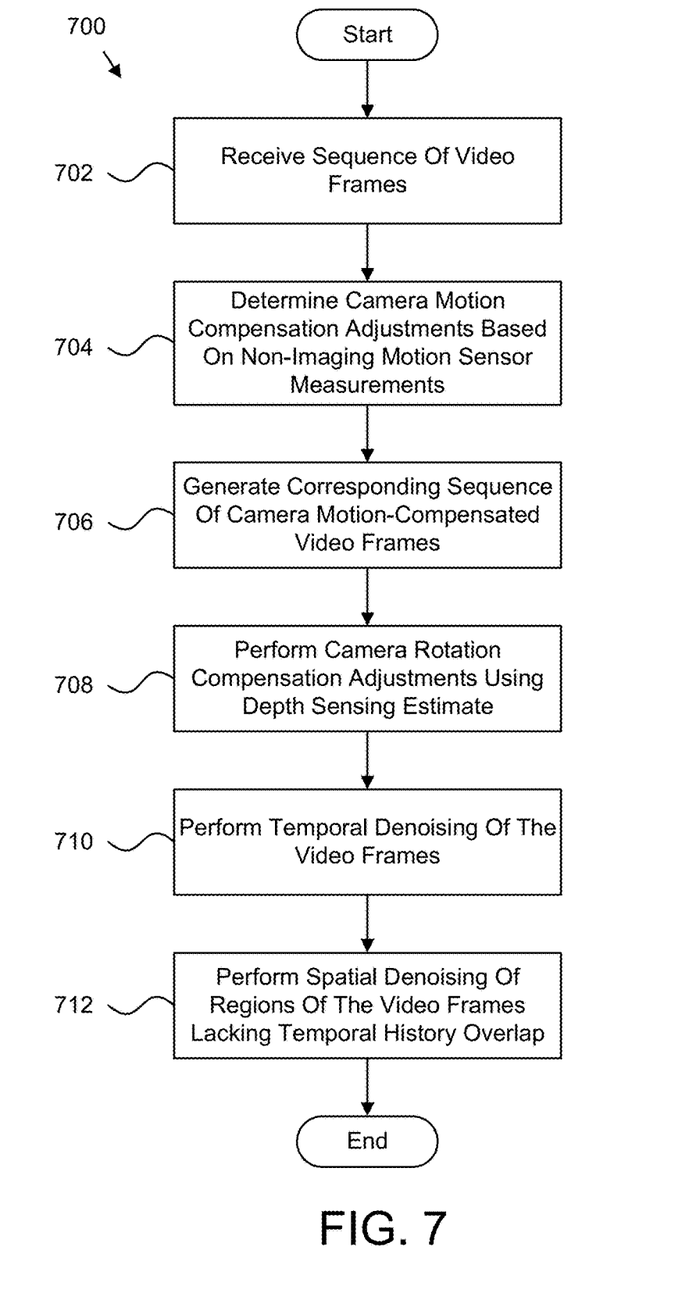
FIG. 7 is a schematic flow chart diagram illustrating another method for device motion aware temporal denoising, according to one or more examples of the present disclosure.

FIG. 7 is a schematic flow chart diagram illustrating another method for device motion aware temporal denoising, according to one or more examples of the present disclosure. In various examples, the method 700 begins and includes receiving 702 video data that includes a sequence of video frames that includes a current frame and one or more preceding frames captured by a video capture device that functions as a camera of a portable electronic device. In certain examples, the method 700 continues and includes determining 704 one or more camera motion compensation adjustments to apply to the one or more preceding frames of the sequence based on one or more non-imaging device motion sensor measurements for the video capture device. In one or more examples, the method 700 further includes generating 706 a sequence of camera-motion compensated preceding frames by applying the one or more camera motion compensation adjustments to the preceding frames of the sequence.

In some examples, the method 700 further includes performing 708 one or more camera rotation compensation adjustments to the one or more preceding frames based on an estimated angular rotation measurement of the camera using the one or more non-imaging device motion sensor measurements adjusted based on the estimated distance between the camera and a target object.

In various examples, the method 700 further includes temporally denoising 710 the current frame by applying a predetermined video denoising process to the current frame using portions of the camera-motion compensated preceding frames which have an overlapping temporal history with the current frame.

In some examples, the method 700 includes performing spatial denoising 712 of portions of current frame which do not have an overlapping temporal history the current frame.

In various examples, the method 700 may be implemented substantially as described above with respect to the functions of the system 100, and the apparatuses 200 and 400, and/or the method 600 depicted respectively in FIGS. 1, 2, 4C, 5B, and 6.

In one or more examples, the method 600, the method 700, and/or the functions of the system 100, the apparatuses 200 and 400, may be implemented in a computer program product. For example, a computer program product, may include a machine-readable storage medium having program instructions embodied therewith, where the program instructions are executable by a processor to cause the processor to: establish data connectivity with a plurality of video sources based on the connecting video sources meeting one or more predetermined proximity criteria; compare values for a set of video parameters corresponding respectively to individual video sources of the plurality of video sources with a predetermined set of active video source criteria for a current activity context; and select an active video source of the plurality of video sources in response to determining that the set of video parameters for the selected source meets the predetermined set of active video source criteria for the current activity context.

Thus, the system 100, the apparatuses 200 and 400, and the methods 600 and 700, and a computer program such as described above may operate individually or collectively according to the various examples disclosed to perform device motion aware temporal denoising and may thereby improve the field of video capture and denoising in portable electronic devices.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for device motion aware temporal denoising, the apparatus comprising:
   a processor; and
   a memory that stores code executable by the processor to:
      receive video data comprising a sequence of video frames that includes a current frame and one or more preceding frames captured by a video capture device that functions as a camera of a portable electronic device;
      determine one or more camera motion compensation adjustments to apply to the one or more preceding frames of the sequence based on one or more non-imaging device motion sensor measurements for the video capture device;
      generate a sequence of camera-motion compensated preceding frames by applying the one or more camera motion compensation adjustments to the preceding frames of the sequence; and
      apply a first denoising process comprising video temporal denoising and/or video spatial denoising to first portions of the current frame which have an overlapping temporal history with the corresponding preceding frames and apply a second denoising process comprising video spatial denoising, rather than temporal denoising, to second portions of the current frame which do not have an overlapping temporal history with the corresponding preceding frames.

2. The apparatus of claim 1, further comprising an inertial measurement unit that generates the one or more non-imaging device motion sensor measurements in response to motion of the video capture device.

3. The apparatus of claim 1, wherein the code is further executable by the processor to apply the one or more camera motion compensation adjustments to the preceding frames of the sequence based on differences in a sequence of camera pose measurements corresponding respectively to the preceding frames relative to a camera pose measurement of the current frame.

4. The apparatus of claim 1, further comprising a connected component motion sensor that generates the one or more non-imaging device motion sensor measurements based on motion of first portion of the portable electronic device that includes the video capture device relative to a second portion of the portable electronic device.

5. The apparatus of claim 1, wherein the one or more camera motion compensation adjustments comprise an x-shift and a y-shift of image pixels of the preceding frames of the sequence to improve alignment of the image pixels of the preceding frames relative to corresponding image pixels of the current frame based on the non-imaging device motion sensor measurements.

6. The apparatus of claim 1, further comprising a depth sensor that enables the processor to determine a measured distance between the camera and a target object within one or more video frames of the sequence to facilitate performing the one or more camera compensation adjustments to the preceding frames.

7. The apparatus of claim 1, wherein the code is further executable by the processor to use a predetermined range of estimated distances between the camera and a target object to perform one or more camera motion compensation adjustments to the preceding frames, in response to determining the that that the camera motion is rotation about a predetermined axis.

8. The apparatus of claim 1, wherein the processor is further configured to:
   receive one or more non-imaging derived object motion measurements of an object within a field of view for the video capture device; and
   apply one or more object motion compensation adjustments to respective portions of the preceding frames of the sequence corresponding to image pixels for the object in the current frame in response to determining that the one or more non-imaging derived object motion measurements are below a predetermined motion threshold.

9. The apparatus of claim 1, wherein the one or more camera-motion compensation adjustments applied to the preceding frames are determined by the processor independently from image pixel values of the preceding frames.

10. A method for device motion aware temporal denoising, comprising:
   receiving video data comprising a sequence of video frames that includes a current frame and one or more preceding frames captured by a video capture device that functions as a camera of a portable electronic device;

determining one or more camera motion compensation adjustments to apply to the one or more preceding frames of the sequence based on one or more non-imaging device motion sensor measurements for the video capture device;

generating a sequence of camera-motion compensated preceding frames by applying the one or more camera motion compensation adjustments to the preceding frames of the sequence; and applying a first denoising process comprising video temporal denoising and/or video spatial denoising to first portions of the current frame which have an overlapping temporal history with the corresponding preceding frames and applying a second denoising process comprising video spatial denoising, rather than temporal denoising, to second portions of the current frame which do not have an overlapping temporal history with the corresponding preceding frames.

11. The method of claim 10, further comprising obtaining the one or more non-imaging device motion sensor measurements from an inertial measurement unit in response to motion for the video capture device.

12. The method of claim 11, further comprising applying the one or more camera motion compensation adjustments to the preceding frames of the sequence based on differences in a sequence of camera pose measurements corresponding respectively to the preceding frames relative to a camera pose measurement corresponding to the current frame.

13. The method of claim 10, further comprising generating the one or more non-imaging device motion sensor measurements based on motion of a first portion of the portable electronic device that includes the video capture device relative to a second portion of the portable electronic device.

14. The method of claim 10, wherein the one or more camera motion compensation adjustments comprise an x-shift and a y-shift of image pixels of the preceding frames of the sequence to improve alignment of the image pixels of the preceding frames relative to corresponding image pixels of the current frame based on the non-imaging device motion sensor measurements.

15. The method of claim 10, further comprising determining a measured distance between the camera and a target object within one or more video frames of the sequence to facilitate performing the one or more camera compensation adjustments to the preceding frames.

16. The method of claim 10, further comprising performing one or more camera rotation compensation adjustments to the one or more preceding frames based on based on a predetermined range of estimated distances between the camera and a target object.

17. The method of claim 10, further comprising:
receiving one or more non-imaging derived object motion measurements of an object within a field of view for the video capture device; and
applying one or more object motion compensation adjustments to respective portions of the preceding frames of the sequence corresponding to image pixels for the object in the current frame in response to determining that the one or more non-imaging derived object motion measurements are below a predetermined motion threshold.

18. The method of claim 10, wherein applying the second denoising process does not include image cropping.

19. The method of claim 10, wherein the one or more non-imaging device motion sensors are hinge angle sensors.

20. A program product comprising a non-transitory computer readable storage medium that stores code executable by a processor, the executable code comprising code to:
receive video data comprising a sequence of video frames that includes a current frame and one or more preceding frames captured by a video capture device that functions as a camera of a portable electronic device;
determine one or more camera motion compensation adjustments to apply to the one or more preceding frames of the sequence based on one or more non-imaging device motion sensor measurements for the video capture device;
generate a sequence of camera-motion compensated preceding frames by applying the one or more camera motion compensation adjustments to the preceding frames of the sequence;
temporally denoise first portions of the current frame by applying a predetermined video denoising process to one or more of the camera-motion compensated preceding frames which have an overlapping temporal history with the first portions of the current frame; and
spatially denoise second portions of the current frame which do not have one or more preceding frames with an overlapping temporal history with the current frame.

* * * * *